(12) United States Patent
Markus

(10) Patent No.: US 6,421,081 B1
(45) Date of Patent: Jul. 16, 2002

(54) REAL TIME VIDEO REAR AND SIDE VIEWING DEVICE FOR VEHICLES VOID OF REAR AND QUARTER WINDOWS

(76) Inventor: Bernard Markus, 7975 Jericho Turnpike, Woodbury, NY (US) 11797

( * ) Notice: Subject to any disclaimer, the term of this patent is extended or adjusted under 35 U.S.C. 154(b) by 0 days.

(21) Appl. No.: 09/227,050

(22) Filed: Jan. 7, 1999

(51) Int. Cl.[7] ................................................. A04N 7/18
(52) U.S. Cl. ..................................... 348/148; 340/436
(58) Field of Search .......................... 348/73, 143, 144, 348/148, 151, 152, 159, 169, 155, 118; 340/436, 435, 901, 903, 937, 426, 429; 701/1

(56) References Cited

U.S. PATENT DOCUMENTS

| | | | | |
|---|---|---|---|---|
| 5,121,200 A | * | 6/1992 | Choi | 348/148 |
| 5,289,321 A | * | 2/1994 | Secor | 348/148 |
| 5,670,935 A | * | 9/1997 | Schofield et al. | 348/148 |
| 5,680,123 A | * | 10/1997 | Lee | 348/148 |
| 5,959,555 A | * | 9/1999 | Furuta | 340/436 |
| 5,978,017 A | * | 11/1999 | Tino | 348/148 |
| 6,002,326 A | * | 12/1999 | Turner | 348/148 |
| 6,115,651 A | * | 9/2000 | Cruz | 340/435 |
| 6,151,065 A | * | 11/2000 | Steed et al. | 348/148 |

* cited by examiner

Primary Examiner—Chris Kelley
Assistant Examiner—Gims Philippe
(74) Attorney, Agent, or Firm—Michael I Kroll

(57) ABSTRACT

A real time video device for viewing the images at the rear and the sides of a vehicle. The real time video device includes a video camera movably mounted to the vehicle for capturing images of events occurring surrounding the vehicle and a video screen mounted within the vehicle and connected to display the images captured by the video camera. A device for moving the video camera along a horizontal plane to capture images along the horizontal plane and a device for moving the video camera along a vertical plane to capture images along the vertical plane are connected to the video camera. A manual control device is connected to the devices for moving the video camera along both the horizontal and vertical planes for capturing images along both the horizontal and vertical planes based upon desires of the driver for real time viewing by the driver of the vehicle on said video screen. An automatic control device is connected to the device for moving the video camera along the horizontal plane for capturing images along said horizontal plane based upon sensed conditions along the sides of the vehicle for display on said video screen to alert the driver to the sensed conditions thereby avoiding blind spots which inhibit the driver from driving safely.

1 Claim, 5 Drawing Sheets

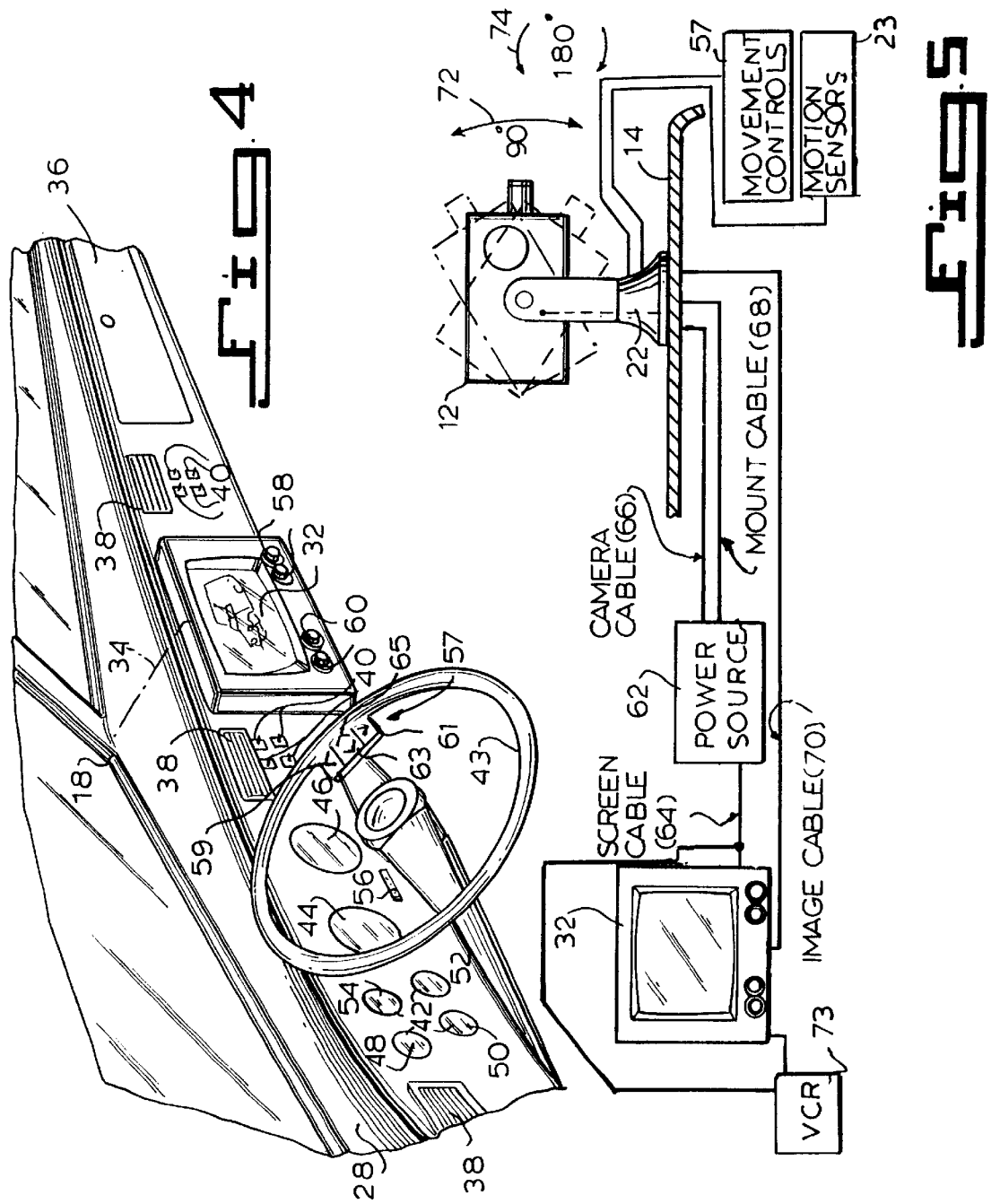

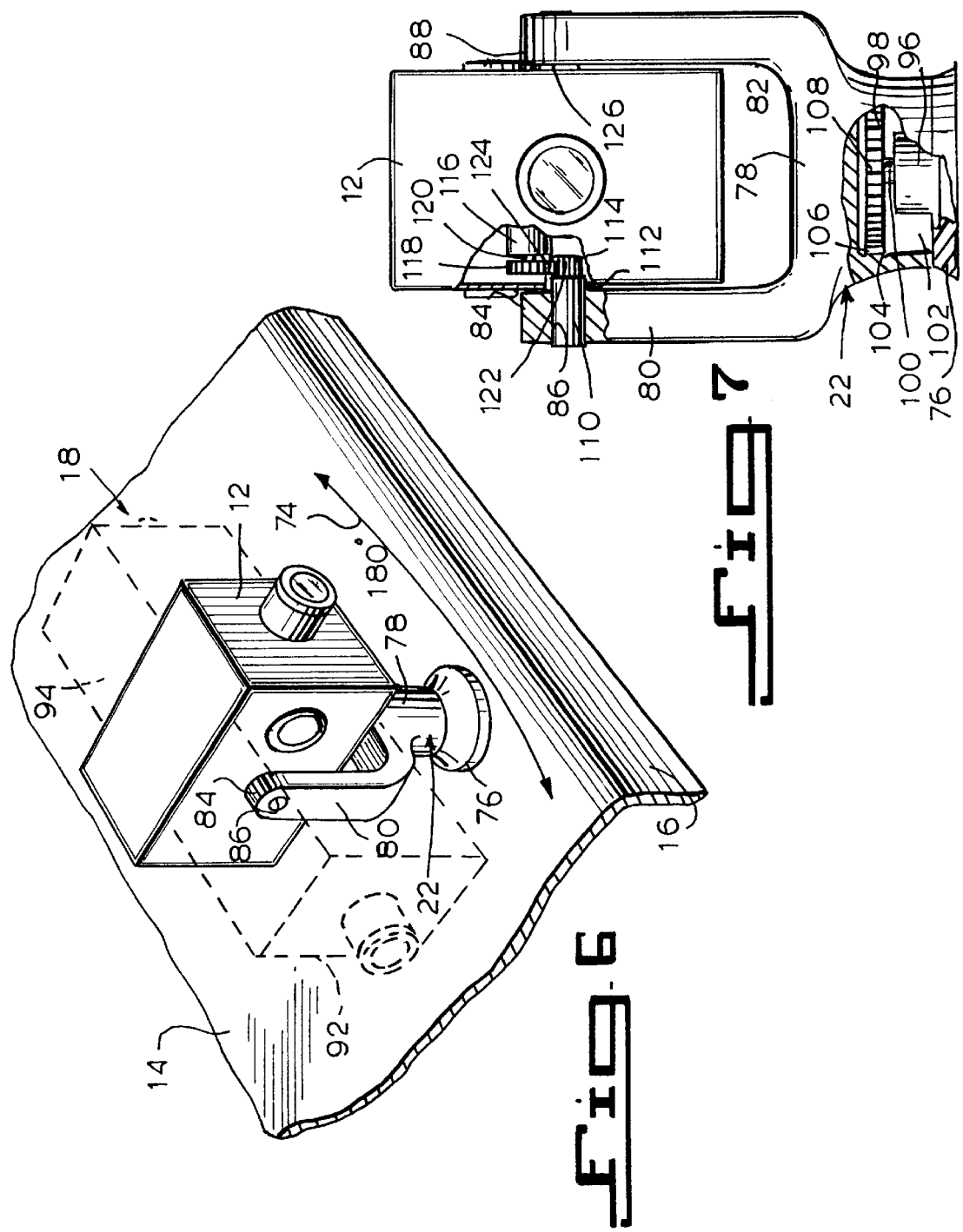

REAL TIME VIDEO REAR AND SIDE VIEWING DEVICE FOR VEHICLES VOID OF REAR AND QUARTER WINDOWS

BACKGROUND OF THE INVENTION

1. Field of the Invention

The present invention relates to rear and side viewing devices for vehicles and, more particularly, the present invention relates to a rear and side viewing device for vehicles providing real time images of the area surrounding the vehicle to a driver of the vehicle by utilizing a video camera.

2. Description of the Prior Art

Numerous innovations for rear and side viewing devices for vehicles void of rear and quarter windows have been provided in the prior art. For example, as shown in FIG. 1, the prior art external rear view mirrors 32a and 32b are mounted to the doors 24a and 24b of the cab portion 20a of a vehicle 18a. The vehicle includes an opaque rear side 17a. With the prior art external rear view mirrors 32a and 32b extending from the sides of vehicle 18a, the width of the vehicle 18a is increased and, more importantly, the mirrors 32a and 32b include blind spots preventing the driver from viewing all areas surrounding the vehicle 18a regardless of the distance to which the prior art external rear view mirrors 32a and 32b extend from the vehicle 18a.

Furthermore, U.S. Pat. Nos. 1,710,040; 4,161,352; 4,934,246; and 4,964,712 are all also illustrative of such prior art. While these units may be suitable for the particular purpose to which they address, they would not be as suitable for the purposes of the present invention as heretofore described.

U.S. Pat. No. 1,710,040

Inventor: Jorgen Boysen

Issued: May 9, 1929

This invention relates to automobile-mirrors, and has for its object to provide a specimen of mirror, somewhat similar to a periscope, which, when properly adjusted, will at all times keep the driver of a car informed as to the movements that take place in the rear of the automobile as well as in front thereof.

U.S. Pat. No. 4,161,352

Inventor: Larry L. Felix et al.

Issued: Jul. 17, 1979

Apparatus for use in surveillance from a vehicle includes an adapter which is mounted adjacent to a wall opening in the vehicle and a casing which is rotatably mounted on the adapter. Mounted within the casing is an extendible-retractable scope for selective shifting through the wall opening. The scope includes a pair of opposed mirror surfaces for reflecting images from outside the vehicle to the inside.

U.S. Pat. No. 4,934,246

Inventor: William M. Benson et al.

Issued: Jun. 19, 1990

A wide angle trapezoidal periscope is disclosed having an upper trapezoidal housing and a smaller lower trapezoidal housing secured to said upper housing having optics sealed therein which include parallel upper and lower windows and parallel upper and lower mirrors. When used on military vehicles, the lower trapezoidal periscope housings are inserted within evenly and closely spaced trapezoidal openings in the rim of a hatch and are secured to the hatch with comer connectors to clamp non-parallel walls of said upper housings within about ⅛ of an inch of the adjacent non-parallel walls of the next adjacent trapezoidal housing. Each periscope provides a vertical field of view of about 43 degrees and a horizontal field of view of about 140 degrees.

U.S. Pat. No. 4,964,712

Inventor: Allen J. Anderson

Issued: Oct. 23, 1990

A device for enabling the driver of a vehicle to view behind the vehicle as he is driving. The apparatus includes a number of elongated periscopes mounted generally vertical within the vehicle. The periscopes are mounted so as to provide adjacent angular fields about a generally vertically-oriented axis. The device further includes a plurality of sleeves, each sleeve receiving a corresponding periscope for axial movement relative thereto. The sleeves are mounted for movement about a generally horizontal axis. Each sleeve includes a pawl member which projects axially from its corresponding sleeve. The apparatus is, further, constructed so that when a main body portion of a periscope is moved telescopically within its corresponding sleeve to bring that sleeve into engagement with a collar carried by a head portion of the periscope, the pawl member will enter one of a plurality of circumferentially-spaced notches formed in the collar to enable rotation of the main body portion of the periscope tube about the axis of elongation thereof.

SUMMARY OF THE INVENTION

The present invention relates to rear and side viewing devices for vehicles and, more particularly, the present invention relates to a rear and side viewing device for vehicles providing real time images of the area surrounding the vehicle to a driver of the vehicle by utilizing a video camera.

A primary object of the present invention to provide a rear and side viewing device for vehicles which will overcome the shortcomings of the prior art.

A further object of the present invention is to provide a real time video rear and side viewing device for vehicles which eliminates the need for prior art external rear view mirrors on vehicles.

A still further object of the present invention is to provide a real time video rear and side viewing device for vehicles which does not fog up and thus reduce the effectiveness of the device.

An even further object of the present invention is to provide a real time video rear and side viewing device for vehicles which displays images of objects so as to appear at their actual distance.

A yet further object of the present invention is to provide a real time video rear and side viewing device for vehicles which reflects images present in the rear and immediately adjacent lane on each side of the vehicle.

An even further object of the present invention is to provide a real time video rear and side viewing device in which images at the rear and sides of the vehicle are captured by a video camera and are available for real time viewing by the driver of the vehicle on a video screen within the vehicle cab thereby eliminating blind spots.

A still further object of the present invention is to provide a real time video rear and side viewing device including a video screen having a plurality of screen picture adjusters, the plurality of screen picture adjusters including adjusters for at least one of brightness, contrast, vertical hold, horizontal hold, and color.

A yet further object of the present invention is to provide a real time video rear and side viewing device including a video screen having a plurality of camera position adjusters, the plurality of camera position adjusters including adjusters for at least one of vertical span, horizontal span, on/off, and focus.

A still further object of the present invention is to provide a real time video rear and side viewing device wherein a vertical scan range of the video camera is 90° and the horizontal scan range of the video camera is 180°.

A yet further object of the present invention is to provide a real time video rear and side viewing device including horizontal motion sensors for detecting objects adjacent the vehicle and turn the video camera to capture an image of the object.

A still further object of the present invention is to provide a real time video rear and side viewing device including manual controls within the cab of the vehicle for controlling the movement of the video camera along the vertical and horizontal scan ranges based upon the desires of the driver.

An even further object of the present invention is to provide a real time video rear and side viewing device including a mount for retaining the video camera having a fixed base portion and a movable fork portion, the movable fork portion being movably affixed to the fixed base portion and including a left fork and a right fork emanating therefrom, the left fork having a left end containing a left throughbore and the right fork having a right end containing a right throughbore.

An even further object of the present invention is to provide a real time video rear and side viewing device wherein the fixed base portion of the mount includes an internally positioned fixed horizontal scan motor having a horizontal scan gear and a revolving shaft, the revolving shaft including a free end to which the horizontal scan gear is affixed.

An even further object of the present invention is to provide a real time video rear and side viewing device wherein the movable fork portion of the mount contains a substantially cylindrically-shaped cavity having an upper side portion, the upper side portion including a closed ring of gear teeth disposed thereon which meshes with the horizontal scan gear, wherein when power is supplied to the fixed horizontal scan motor the horizontal scan gear is caused to revolve via the revolving shaft thereby causing the mount and ultimately the video camera to revolve through the 180° horizontal scan range as desired by the user.

An even further object of the present invention is to provide a real time video rear and side viewing device including a stationary pin having a first end including a fixed pin gear. The stationary pin is fixedly secured within the left throughbore of the left fork and extends into the video camera. The video camera contains an internally fixed vertical scan motor having a vertical scan gear and a revolving shaft, the revolving shaft includes a free end to which the vertical scan gear is affixed, the fixed pin gear meshes with the vertical scan gear whereby when power is supplied to the fixed vertical scan motor the vertical scan gear and thus the video camera are caused to revolve through the 90° vertical scan range, as required by the user.

An even further object of the present invention is to provide a real time video rear and side viewing device including a pivot pin pivotally passing through the right throughbore contained in the right fork and rigidly affixed to the video camera.

An even further object of the present invention is to provide a real time video rear and side viewing device including a watertight gasket seal disposed around the perimeter of the throughbore in the top of the vehicle whereby the junction between the hollow tubular substantially cylindrically-shaped body portion and the throughbore will not leak.

An even further object of the present invention is to provide a real time video rear and side viewing device wherein the substantially prism-shaped receiving portion includes a transparent pane of glass wherein images captured from the rear and sides of the vehicle can pass therethrough.

An even further object of the present invention is to provide a real time video rear and side viewing device including a horizontal scan range of 180° and a vertical scan range dependent upon the length of the hollow tubular substantially cylindrically-shaped body portion. The substantially prism-shaped receiving portion and the substantially prism-shaped viewing portion both functioning as limit points for the vertical scan range.

Additional objects of the present invention will appear as the description proceeds.

A real time video device for viewing the images at the rear and the sides of a vehicle is disclosed by the present invention. The real time video device includes a video camera movably mounted to the vehicle for capturing images of events occurring surrounding the vehicle and a video screen mounted within the vehicle and connected to display the images captured by the video camera. A device for moving the video camera along a horizontal plane to capture images along the horizontal plane and a device for moving the video camera along a vertical plane to capture images along the vertical plane are connected to the video camera. A manual control device is connected to the devices for moving the video camera along both the horizontal and vertical planes for capturing images along both the horizontal and vertical planes based upon desires of the driver for real time viewing by the driver of the vehicle on said video screen. An automatic control device is connected to the device for moving the video camera along the horizontal plane for capturing images along said horizontal plane based upon sensed conditions along the sides of the vehicle for display on said video screen to alert the driver to the sensed conditions thereby avoiding blind spots which inhibit the driver from driving safely.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

FIG. 4 is a front perspective view of the dashboard of the cab portion of the vehicle of FIG. 3;

FIG. 5 is a schematic block diagram of the real time video rear and side viewing device of the present invention illustrating the vertical span range of the video camera, in phantom;

FIG. 6 is a top perspective view of the video camera of the real time video rear and side viewing device of the present invention mounted to the top of the cargo portion of the vehicle illustrating the horizontal span range of the video camera, in phantom;

FIG. 7 is a front view of the video camera of the real time video rear and side viewing device of the present invention with parts broken away illustrating the positioning mechanisms of the video camera.

DESCRIPTION OF THE REFERENCED NUMERALS

Figure 1:
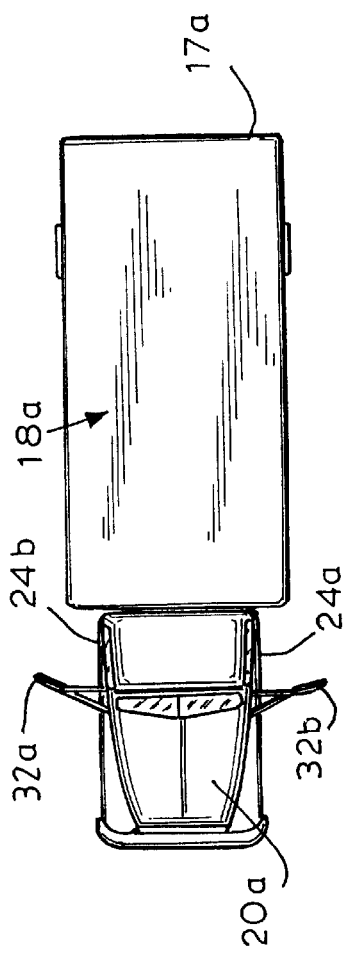
FIG. 1 is a top perspective view of a prior art vehicle without the use of rear and quarter windows and using a rear view mirror for viewing along the sides of the vehicle.
Figure 2:
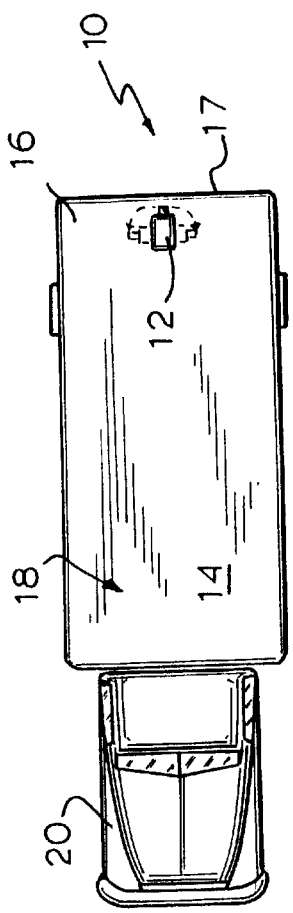
FIG. 2 is a top perspective view of a vehicle using the real time video rear and side viewing device of the present invention for viewing.

Turning now descriptively to the drawings, in which similar reference characters denote similar elements throughout the several views, the Figures illustrate the real time video rear and side viewing device of the present invention. With regard to the reference numerals used, the following numbering is used throughout the various drawing figures.

12 video camera of the present invention
14 top
16 cargo portion
18 vehicle utilizing video camera of the present invention
20 cab portion of the vehicle
22 mount for video camera
23 motion sensors
24 door of cab portion
26 interior of the cab portion
28 dashboard of the cab portion
30 items mounted on or in the dashboard
32 video screen mounted in the dashboard
34 approximate center of the dashboard
36 glove compartment of the dashboard
38 plurality of ventilation vents (HVAC) on the dashboard
40 a plurality of control switches on the dashboard
42 plurality of gauges on the dashboard
43 steering wheel on the dashboard
44 speedometer of the plurality of gauges
46 tachometer of the plurality of gauges
48 amp gauge of the plurality of gauges
50 coolant temperature gauge of the plurality of gauges
52 ohm gauge of the plurality of gauges
54 fuel gauge of the plurality of gauges
56 drive selector indicator of the plurality of gauges
57 plurality of directional buttons
58 plurality of screen picture adjusters for the video screen
59 upward directional button
60 plurality of camera position adjusters for the video camera vertical
61 downward directional button
62 power pack for powering the video camera
63 leftward directional button
64 screen cable of the video camera
65 rightward directional button
66 camera cable of the video camera
68 mount cable of the video camera
70 image cable of the video camera
72 arrow indicating vertical span of the video camera
73 video cassette recorder
74 arrow indicating horizontal span of the video camera
76 fixed base portion of the mount
78 movable fork portion of the mount
80 left fork of the movable fork portion
82 right fork of the movable fork portion
84 end of the left fork
86 throughbore contained in the left fork
88 end of the right fork
90 throughbore contained in the right fork
92 left phantom video camera of the video camera
94 right phantom video camera of the video camera
96 fixed horizontal span motor of the video camera
98 horizontal span gear of the video camera
100 revolving shaft of the fixed horizontal span motor
102 substantially cylindrically shaped cavity contained in the movable fork portion
104 upper side portion of the substantially cylindrically shaped cavity
106 closed ring of gear teeth disposed on the upper side portion
108 teeth of the horizontal span gear
110 stationary pin of the video camera
112 throughbore contained in the video camera
114 fixed gear terminating in the stationary pin
116 fixed vertical span motor of the video camera
118 vertical span gear
120 rotating shaft of the fixed vertical span motor
122 teeth of the fixed gear
124 teeth of the vertical span gear
126 pivot pin of the video camera

DETAILED DESCRIPTION OF THE PREFERRED EMBODIMENT

Turning now descriptively to the drawings, in which similar reference characters denote similar elements throughout the several views, FIGS. 2 through 8 illustrate the real time video rear and side viewing device of the present invention indicated generally by the numeral 10.

A top perspective view of a video camera 12 for use with the real time video rear and side viewing device 10 of the present invention is shown mounted to the top 14 of the cargo portion 16 of a vehicle 18. The vehicle 18 also includes a cab portion 20. The cargo portion 16 is void of any rear and quarter windows and thus, it is difficult for a driver of the vehicle 18 to see other vehicles both behind and along the sides of the vehicle 18 when driving on the road.

Figure 3:
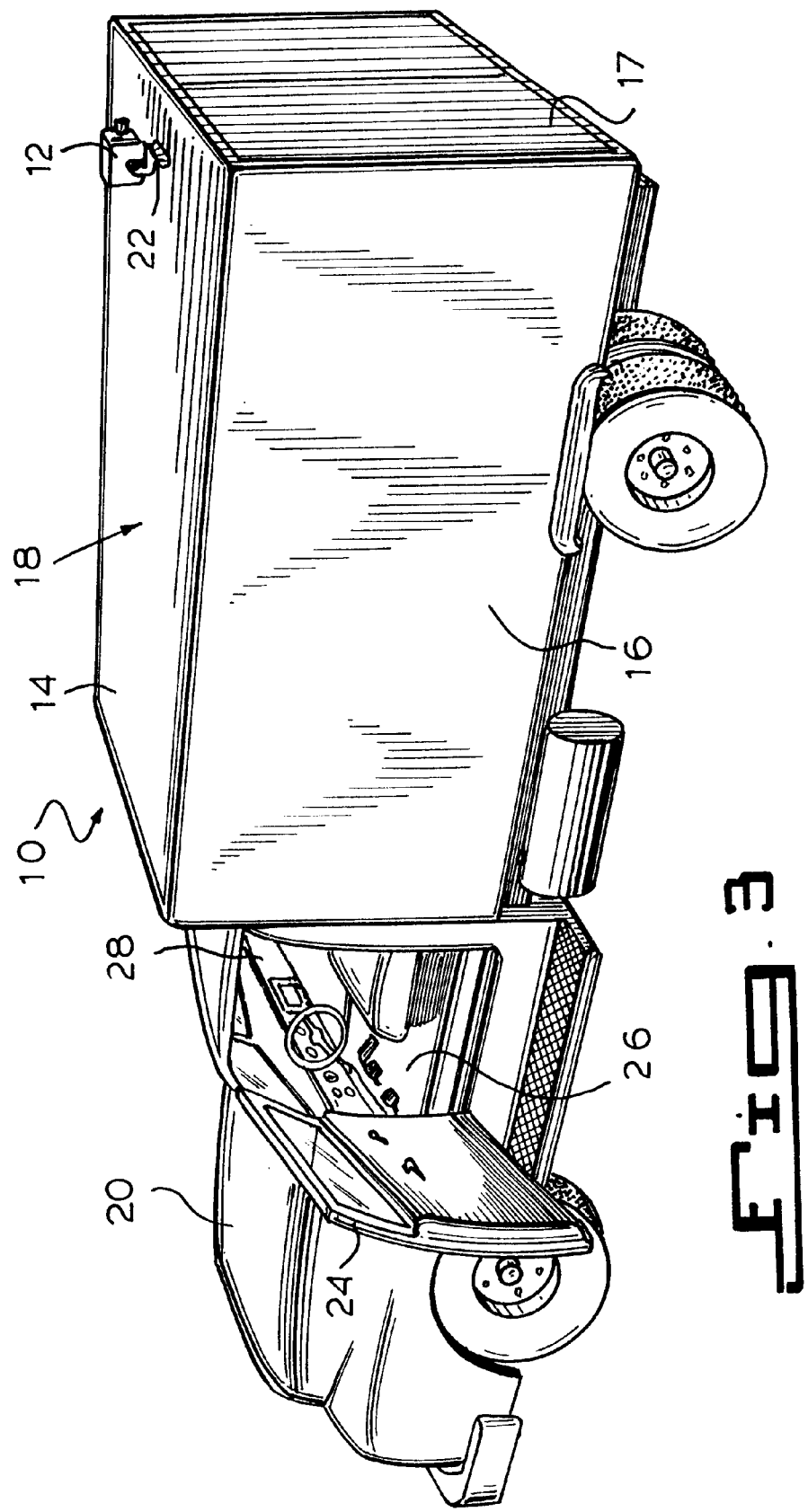
FIG. 3 is a side perspective view of the vehicle including the real time video rear and side viewing device of the present invention shown in FIG. 2, wherein a door of the cab portion is opened to illustrate the interior of the cab portion of the vehicle.

As shown in FIG. 3, the video camera 12 is rigidly mounted to the top 14 of the cargo portion 16 of the vehicle 18 by a mounting structure 22. On either side of the video camera are positioned motion sensors 23. The motion sensors are able to detect objects moving on either side of the vehicle 18 and direct the video camera 12 to turn towards the object alerting the driver as to its presence. A door 24 of the cab portion 20 is in the open position to reveal the interior 26 thereof. Within the interior 26 of the cab portion 20 is a dashboard 28 mounted to a firewall (not shown) of the vehicle 18 in a commonly known manner. The connection between the dashboard 28 and the firewall does not form part of the present invention and thus will not be discussed further. In addition to the standard complement of items 30 mounted on or in the dashboard 28 is a video screen 32, preferably mounted in a substantially central portion 34 of the dashboard 28.

The details of the dashboard 28 can be more clearly seen in FIG. 4. The dashboard 28 contains a glove compartment 36, a plurality of ventilation vents for heating, ventilating and air conditioning (HVAC) 38, a plurality of control switches 40 for controlling certain conditions within the vehicle 18, and a plurality of gauges 42 for monitoring the condition of the engine (not shown) of the vehicle 18. The plurality of gauges 42 can include a speedometer 44, a tachometer 46, an amp gauge 48, a coolant temperature gauge 50, an ohm gauge 52, a fuel gauge 54, and a drive selector indicator 56. A steering wheel 43 is also present extending from the dashboard 28. The steering wheel 43 includes a plurality of directional buttons 57 positioned thereon for use in controlling the movement of the camera 12 as will be explained hereinafter. The plurality of directional buttons 57 includes an upward directional button 59 for directing an upward vertical movement of the camera, a downward directional button 61 for directing a downward vertical movement of the camera, a leftward directional button 63 for directing a leftward horizontal movement of the camera and a rightward directional button 65 for directing a rightward horizontal movement of the camera.

The video screen 32 that is mounted in the approximate center 34 of the dashboard 28 includes a plurality of screen picture adjusters 58 and a plurality of camera position adjusters 60. The plurality of screen picture adjusters 58 include adjusters for brightness, contrast, vertical hold, horizontal hold, color, etc. The plurality of camera position adjusters 60 include adjusters for vertical position, horizontal position, on/off, focus, etc. for the video camera 12. The video screen 32 is also connected to a video cassette recorder 73 for taping the images captured by the video camera 12 and displayed on the video screen 32.

The schematic diagram of the present invention may be best seen in FIG. 5. The video screen 32 is connected to a power pack 62 by a screen cable 64 containing a plurality of conductors (not shown). The power pack 62 may be the vehicle battery wherein the real time video rear and side viewing device 10 will be activated upon turning the ignition of the vehicle 18 or may be a separate power source connected within the vehicle 18. The video camera 12 is connected to the power pack 62 by a camera cable 66 containing a plurality of conductors (not shown). The mount 22 is connected to the power pack 62 by a mount cable 68 containing a plurality of conductors (not shown). Additionally, an image cable 70 is provided between the video cassette recorder 73 and the camera 12 and the video screen 32 is connected to the video cassette recorder 73 for transmission of images for recording and display. The video cassette recorder 73 is connected between the power pack 62 and the screen for recording all images displayed on the screen 32. The video recording of the images displayed on the screen can be used to view any accidents which the video camera may capture and thus aid in determining the cause of the accident. The plurality of movement buttons 57 are connected to manually turn the video camera 72 as desired by the driver and motion sensors 23 are also connected to turn the video camera 72 across the horizontal scan range as other vehicles on the road approach the vehicle 18 from either side thus alerting the driver as to their presence.

Additionally, it can be seen from FIG. 5, that the video camera 12 of the present invention can span 90° in the vertical direction, as shown by arrow 72, and can span 180° in the horizontal direction, as shown by arrow 74.

As shown in FIGS. 6 and 7, the mount 22 of the video camera 12 includes a fixed base portion 76 which is rigidly affixed to the top 14 of the cargo portion 16 of the vehicle 18. The mount 22 also includes a movable fork portion 78 that is free to rotate 180°, as shown by the arrow 74, about the fixed base portion 76 of the mount 22. The movable fork portion 78 includes a left fork 80 and a right fork 82 emanating therefrom. The left fork 80 includes an end 84 that contains a throughbore 86. Likewise, the right fork 82 includes an end 88 that contains a throughbore 90.

The left phantom video camera 92 and the right phantom video camera 94 indicate the extremes of the horizontal span range of the video camera 12, while the arrow 74 further indicates the horizontal span range of the video camera 12.

The mechanism for rotating the video camera 12 through its horizontal span and its vertical span ranges, is shown in FIG. 7. Internal to the fixed base portion 76, of the mount 22 is disposed a fixed horizontal span motor 96. The fixed horizontal span motor 96 carries a horizontal span gear 98, on its revolving shaft 100. Internal to the movable fork portion 78 is contained a substantially cylindrically shaped cavity 102 whose upper side portion 104 contains a closed ring of gear teeth 106. The closed ring of gear teeth 106 mesh with the teeth 108 of the horizontal span gear 98.

As power is supplied to the fixed horizontal span motor 96, the horizontal span gear 98, via the revolving shaft 100, revolves the movable mount 22, for horizontal position of the video camera 12 through its 180° horizontal span range. Horizontal movement of the video camera 12 is controlled either manually by the driver using the movement buttons 57 positioned on the steering wheel 43 or automatically by the motion sensors 23 connected to the video camera 12 as objects are sensed passing the vehicle 18 on either side.

A stationary pin 110 is fixedly secured within the throughbore 86 of the left fork 80. The stationary pin 110 continues, via a throughbore 112 contained in the video camera 12, into the video camera 12 and terminates with a fixed gear 114.

The video camera 12 contains a fixed vertical span motor 116 carrying a vertical span gear 118 on its rotating shaft 120. The teeth 122 of the fixed gear 114 mesh with the teeth 124 of the vertical span gear 118.

As power is supplied to the fixed vertical span motor 116, the vertical span gear 118, via the rotating shaft 120, revolves the video camera 12, through its 90° vertical span, as required by the user. A pivot pin 126 is rigidly affixed to the video camera 12 and pivotally passes through the throughbore 90 contained in the right fork 82 of the movable fork portion 78, of the mount 22.

Figure 8:
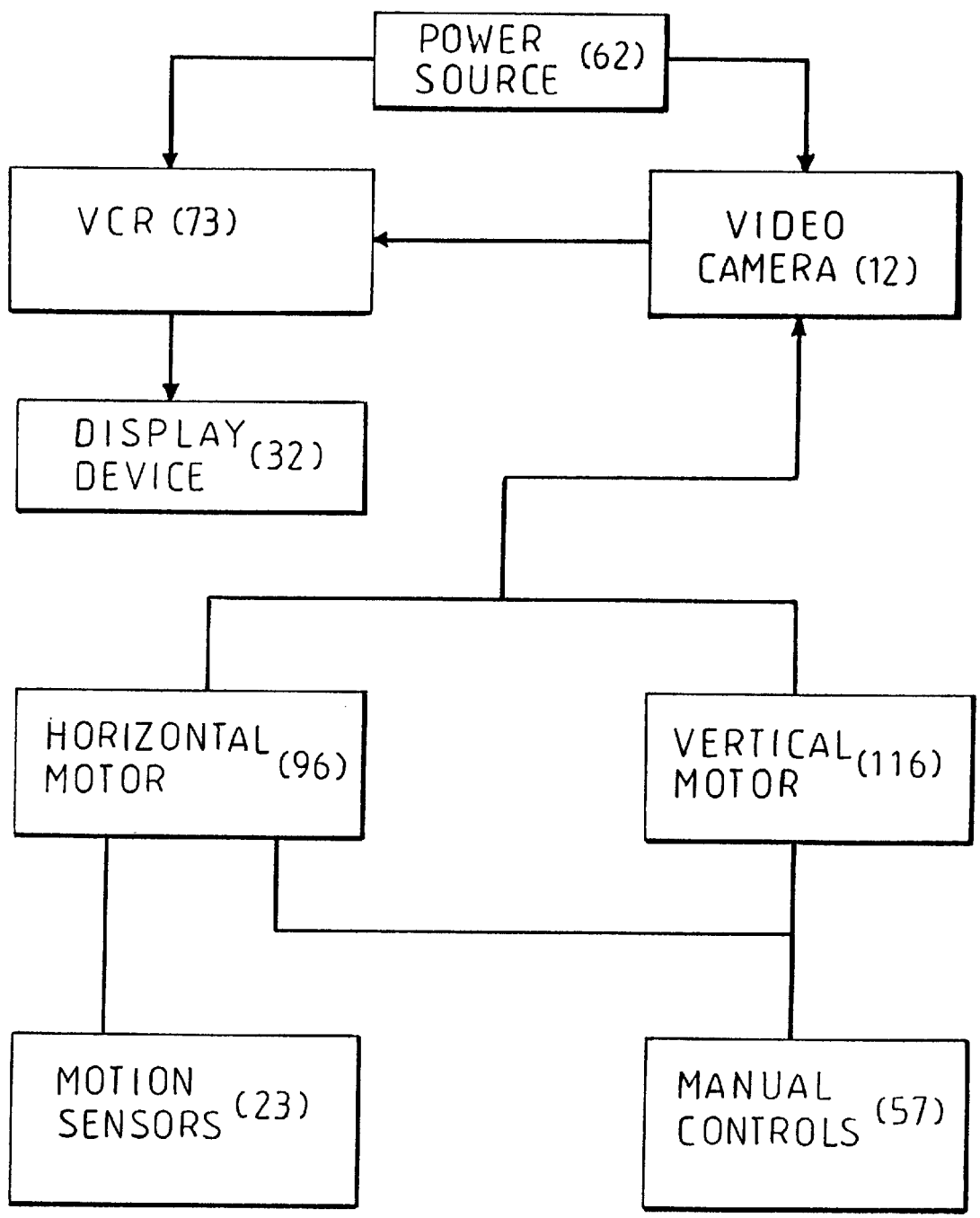
FIG. 8 is a schematic block diagram of the real time video rear and side viewing device of the present invention.

A schematic block diagram of the real time video rear and side viewing device of the present invention is illustrated in FIG. 8. As can be seen from this diagram the power source 62 is connected to supply power to both the video camera 12 and the video cassette recorder 73; The video camera 12 is also directly connected to the video cassette recorder 73 for supplying images captured thereby to the video cassette recorder 73 for recording. The video cassette recorder 73 is connected to the display device 32 for supplying the images received from the video camera 12 to be displayed thereon. The video camera 12 is connected to the horizontal motor 96 and the vertical motor 116 for controlling the movement of the video camera 12. The horizontal motor 96 is driven by both the motion sensors 23 and the manual movement control buttons 57 to turn the video camera through its horizontal span range. The vertical motor 116 is driven by the manual movement control buttons 57 to turn the video camera through its vertical span range.

The operation of the real time video rear and side viewing device 10 will now be described with reference to the figures. In operation, the video camera 12 of the real time video rear and side viewing device 10 is mounted on a top 14 of the vehicle 18 so as to capture images on either side and behind the vehicle 18. A motor for turning the video camera 12 in both the horizontal and vertical directions, 96 and 116 respectively, is connected to the video camera 12. The video camera 12 is also connected to either the vehicle battery or a separate power source 62. Motion sensors 23 are connected to control the horizontal motor 96 to automatically turn the video camera 12 based upon sensed conditions. Manual movement control buttons are positioned within the cab portion 20 of the vehicle 18 and preferably connected to the steering wheel 43 for being readily reachable by the driver of the vehicle 18. The manual movement control buttons 57 are connected to control both the horizontal and vertical motors 96 and 116, respectively, to automatically turn the video camera 12 based upon the desires of the driver.

When the vehicle 18 is turned on the real time video rear and side viewing device 10 is automatically activated. The video cassette recorder 73, video screen 32 and the video camera 12 are turned on and the video screen 32 begins to display the images captured by the video camera 12. The video cassette recorder 73 includes a looped tape therein and begins to record the images captured by the video camera 12. The looped tape within the video cassette recorder 73 will be able to tape the images captured by the video camera 12 for a certain predetermined period of time and then record over the tape as it loops around. Thus, the area surrounding the vehicle 18 as it travels along the road can be taped and any accidents or occurrences happening around the vehicle can be recorded for later viewing. This will aid in determining the cause of numerous accidents.

As the driver is driving along the road, the movement control buttons may be used to control the direction at which the video camera points allowing the driver to view different sides of the vehicle on the video screen 32. The activation of any of the movement control buttons 57 will transmit a signal to either the horizontal or vertical motor causing it to turn the video camera 12 as desired. The video camera 12 will capture images within its field of view as it is moved and thus the driver can observe the area surrounding the entire vehicle 18. The movement of the video camera 12 is also automatically controlled to move in the horizontal direction by the motion sensors 23 connected thereto. The motion sensors detect objects moving along either side of the vehicle 18 and turn the video camera 12 towards the object thus alerting the driver as to their presence. Manual and automatic movement of the video camera 12 will continue for as long as the vehicle 18 is in operation and thus the driver is aware of conditions surrounding the entire vehicle 18 and eliminating any blind spots which may cause the driver to be unaware of certain occurrences surrounding the vehicle 18.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be Protected by Letters patent is set forth in the appended claims:

1. A real time video device for viewing the images at the rear and the sides of a vehicle, said real time video device comprising:

a) means for movably mounting video camera on a top of the vehicle for capturing images of events occurring surrounding the vehicle;

b) a video screen mounted within the vehicle and connected to display said images captured by said video camera;

c) means for moving said video camera along a horizontal plane to capture images along said horizontal plane;

d) means for moving said video camera along a vertical plane to capture images along said vertical plane;

e) manual control means connected to both said means for moving said video camera along said horizontal plane and means for moving said video camera along said vertical plane for capturing images along both said horizontal and vertical plans based upon desires of the driver for real time viewing by the driver of the vehicle on said video screen;

f) automatic control means comprising motion sensors connected to said means for moving said video camera along said horizontal plane for turning said camera toward an object moving on either side of the vehicle for display on said video screen to alert the driver to the sensed conditions thereby avoiding blind spots which inhibit the driver from driving safely;

g) a video cassette recorder connected between said video camera and video screen for recording images on a looped video tare captured by said video camera and displayed on said video screen;

h) said means for moving said video camera along said horizontal plane is positioned within said means for mounting the video camera and includes a movable fork portion, a fixed horizontal span motor having a horizontal span gear and a revolving shaft with a free end, said horizontal span gear being affixed to said free end of said revolving shaft of said fixed horizontal span motor;

i) said movable fork portion of said mount having a substantially cylindrical 180° horizontal span range actuated by either of said manual and,automatic control means;

j) said movable fork portion having a left fork and a right fork, said left fork including a throughbore extending therethrough and further comprising a stationary pin having an end with a fixed vertical span gear within said camera;

k) said means for moving said video camera along said vertical plane comprising a fixed vertical span motor within said camera engaged with said fixed vertical span gear and having a vertical span range of 90° extending along said vertical plane; and l) said right fork includes a throughbore extending therethrough and said device further comprises a pivot pin rigidly affixed to said video camera and pivotally passing through said throughbore extending through said right fork.

* * * * *